United States Patent
Baumeler

(10) Patent No.: US 9,193,020 B2
(45) Date of Patent: Nov. 24, 2015

(54) WIRE CUTTING METHOD

(71) Applicant: Agie Charmilles SA, Losone (CH)

(72) Inventor: Marco Baumeler, Lodano (CH)

(73) Assignee: Agie Charmilles SA, Losone (CH)

( * ) Notice: Subject to any disclaimer, the term of this patent is extended or adjusted under 35 U.S.C. 154(b) by 281 days.

(21) Appl. No.: 13/727,169

(22) Filed: Dec. 26, 2012

(65) Prior Publication Data

US 2013/0180866 A1   Jul. 18, 2013

(30) Foreign Application Priority Data

Dec. 30, 2011   (CH) ...................................... 2061/11

(51) Int. Cl.
| | |
|---|---|
| *B23Q 5/22* | (2006.01) |
| *B23H 7/06* | (2006.01) |
| *B23H 1/02* | (2006.01) |
| *B24B 1/00* | (2006.01) |
| *B26D 1/547* | (2006.01) |
| *B26D 1/553* | (2006.01) |
| *C25F 7/00* | (2006.01) |

(52) U.S. Cl.
CPC .. *B23Q 5/22* (2013.01); *B23H 1/02* (2013.01); *B23H 7/065* (2013.01); *B24B 1/00* (2013.01); *B26D 1/547* (2013.01); *B26D 1/553* (2013.01); *C25F 7/00* (2013.01); *Y10T 83/05* (2015.04)

(58) Field of Classification Search
CPC ............ B23H 7/065; B23H 7/06; B23H 1/02; B23Q 5/22; B26D 1/547; B26D 1/553; B24B 1/00; C25F 7/00; Y10T 83/05
See application file for complete search history.

(56) References Cited

U.S. PATENT DOCUMENTS

| | | | |
|---|---|---|---|
| 5,052,366 A | 10/1991 | Matsukura | |
| 8,242,403 B2 | 8/2012 | Angelella et al. | |
| 2003/0145707 A1 | 8/2003 | Hauser | |
| 2009/0014420 A1* | 1/2009 | Sato | 219/69.12 |
| 2010/0187204 A1* | 7/2010 | Angelella et al. | 219/69.17 |

FOREIGN PATENT DOCUMENTS

| | | | |
|---|---|---|---|
| DE | 3940691 A1 | | 6/1991 |
| EP | 2213400 A1 | | 8/2010 |
| EP | 2295180 A2 | | 3/2011 |
| JP | 62-114828 A | | 5/1987 |
| JP | 06143037 A | | 5/1994 |
| JP | 2009-226504 A | * | 10/2009 |
| JP | 2011-056634 A | * | 3/2011 |

OTHER PUBLICATIONS

Machine translation of Japan Patent document No. 2009-226,504, Jan. 2015.*
Machine translation of Japan Patent document No. 2011-056,634, Jan. 2015.*

(Continued)

*Primary Examiner* — Geoffrey S Evans
(74) *Attorney, Agent, or Firm* — Bachman & LaPointe, P.C.

(57) ABSTRACT

A method for cutting by a traveling wire, wherein the wire traveling direction of the wire and/or the workpiece are/is inclined alternately in relation to one another into at least two different specific angular positions in the cutting direction, with the result that the effective cutting height (s) on the workpiece (2) becomes smaller than the entire workpiece height.

22 Claims, 6 Drawing Sheets

(56) References Cited

OTHER PUBLICATIONS

"Experience" No. 23, Id. 027.158, Agie SA, Oct. 2003, Switzerland.
"Design of Hybrid-Kinematic Mechanisms for Machine Tools" by Patric Pham, Thesis EPFL 4314, p. 130 (http://dx.doi.org/10.5075/epfl-thesis-4314), Feb. 20, 2009, Lausanne, Switzerland.
European Search Report for European Patent Application No. 12197230, dated Apr. 9, 2013.
Applicant Admitted Prior Art: FW1P Fastwire Machine Data, http://blueline.gfac.com/index.php?id=14942&L=0, Jan. 2013, GF Agie Charmilles, Switzerland.

* cited by examiner

WIRE CUTTING METHOD

BACKGROUND OF THE INVENTION

The present invention relates to a method for cutting by means of a traveling wire.

Wire electric discharge machines serve for the manufacture of blanking dies, punches, electrodes and extruding dies, but also for the manufacture of small to medium series and often in prototype construction.

Under optimal conditions, modern wire electric discharge machines (WEDM) attain cutting rates of 500 mm$^2$/min in cold work steel. The cutting rate is dependent, inter alia, upon the workpiece height. Reference is made in this regard to the company publication "Experience" No. 23, Id. 027.158, of the company Agie SA, published in October 2003. A qualitative illustration of the cutting rate against the workpiece height will be gathered from the last page (back sheet) of this publication. This somewhat simplified graph starts with the workpiece height of 20 mm, but suggests that the cutting rate fall steeply with a low workpiece height. The illustration of the cutting rate shows a maximum at a workpiece height of approximately 50 mm. In the medium workpiece height range of about 30 to 100 mm, the cutting rate is very close to maximum. The cutting rate falls again with a greater workpiece height.

In WEDM, the dielectric is sprayed into the cutting gap at high pressure for the purpose of discharging the removed particles, specifically, selectively, via the lower wire guide head, the upper wire guide head or both. The width of the cutting gap corresponds to the wire diameter plus double the spark gap width plus wire oscillation, that is to say about 0.05 to 0.5 mm. The flushing liquid is routed directly into the cutting gap, although pressure loss is detectable in the case of a greater workpiece height. The higher the workpiece is, the more difficult the flushing conditions become.

In the case of very small workpiece heights, the conditions are exactly reversed. Gap flushing is highly effective. The contamination of the spark gap is comparatively low, although this is somewhat of a hindrance for a stable process.

The abovementioned characteristic is especially important in the case of low-conductive materials. A relatively good cutting rate can be achieved at small to medium workpiece heights. However, when the workpiece height is relatively large, advance is only very slow.

SUMMARY OF THE INVENTION

The present invention is intended to remedy this. The object is achieved, according to the invention, in that the wire electrode is inclined in the cutting direction, so that the workpiece height is divided into at least two subsections.

The invention relates to a method and a device for cutting by means of one or more traveling wires, in particular spark-erosive, electrochemical or abrasive cutting or a mixed process in which one or more wires is or are inclined alternately in at least two different specific angular positions in the cutting direction, with the result that the effective cutting height on the workpiece becomes smaller than the entire workpiece height.

The prior art already discloses some methods in which a wire is inclined in a cutting direction. EP2213400 describes a method for spark-erosive cutting (WEDM) in which the wire electrode is inclined in the cutting direction as a function of the respective contour curvature, in order to counteract the formation of ridges and generate a finer surface. The wire electrode is in this case inclined slowly and progressively until the permissible oblique position is reached, and is then straightened slowly again in order to avoid discontinuities. The aim of this publication, therefore, is to improve the working result. JP6-143037 describes a method for spark-erosive cutting (WEDM) in which the wire electrode is inclined in a cutting direction at first cut, in order to form a cutting gap as quickly as possible and consequently suppress wire electrode oscillation. The wire electrode is straightened slowly and progressively in the cutting gap in order to prevent discontinuities. The aim of this publication, therefore, is to stabilize the process in the first-cut phase.

The primary aim of the present invention, by contrast, is to achieve a higher cutting rate and therefore higher productivity of the machining equipment.

BRIEF DESCRIPTION OF THE DRAWINGS

The invention is now presented in more detail by means of the figures in which.

DETAILED DESCRIPTION

As mentioned above, the invention relates to a method for cutting by means of at least one traveling wire 1 which is inclined alternately in at least two different specific angular positions in the cutting direction r. The effective cutting height s is therefore smaller than the entire workpiece height h or smaller than the cutting height which is obtained during cutting with a single specific angular position of the wire (that is to say, without a periodic setting of a second angular position in the cutting direction).

A changeover is made, for example, periodically between a first and a second specific angular position, the wire 1 in each case being inclined in the cutting direction. Machining in the two specific angular positions of the wire 1 is preferably set for the same time duration. Thus, the traveling wire 1 is not in engagement over the entire workpiece height, but instead, on average, only over half the workpiece height. The evacuation of the removed particles is facilitated considerably and the cutting rate is improved, particularly in the case of high workpieces. The said cutting method is a spark-erosive, electrochemical or abrasive cutting method or a hybrid cutting method.

Figure 1:
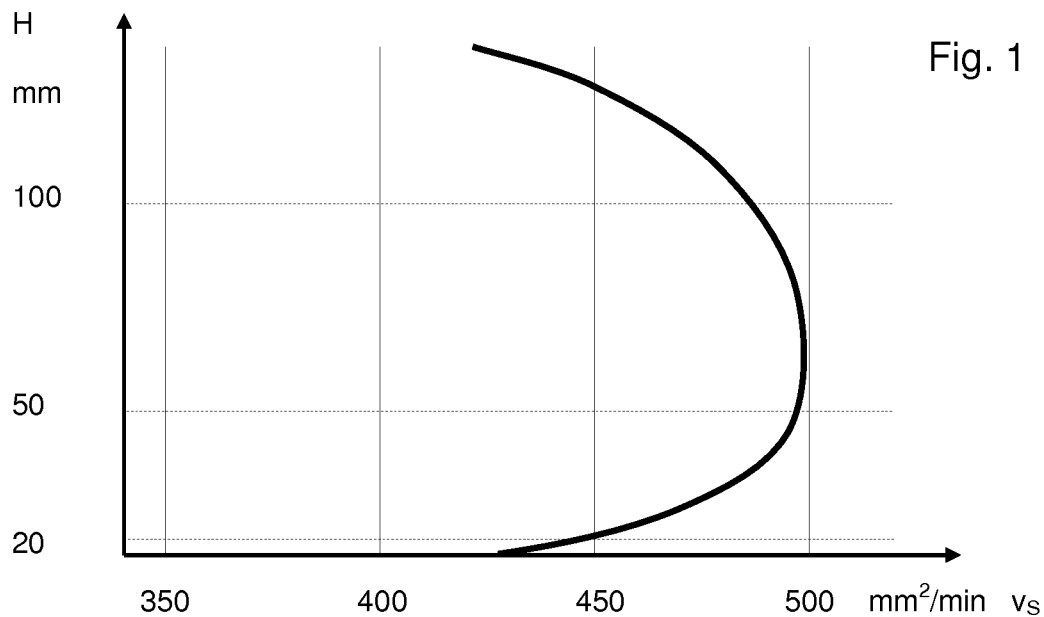
FIG. 1 shows a graph of the cutting rate as a function of the workpiece height by the example of a wire electric discharge machine.
Figure 2:
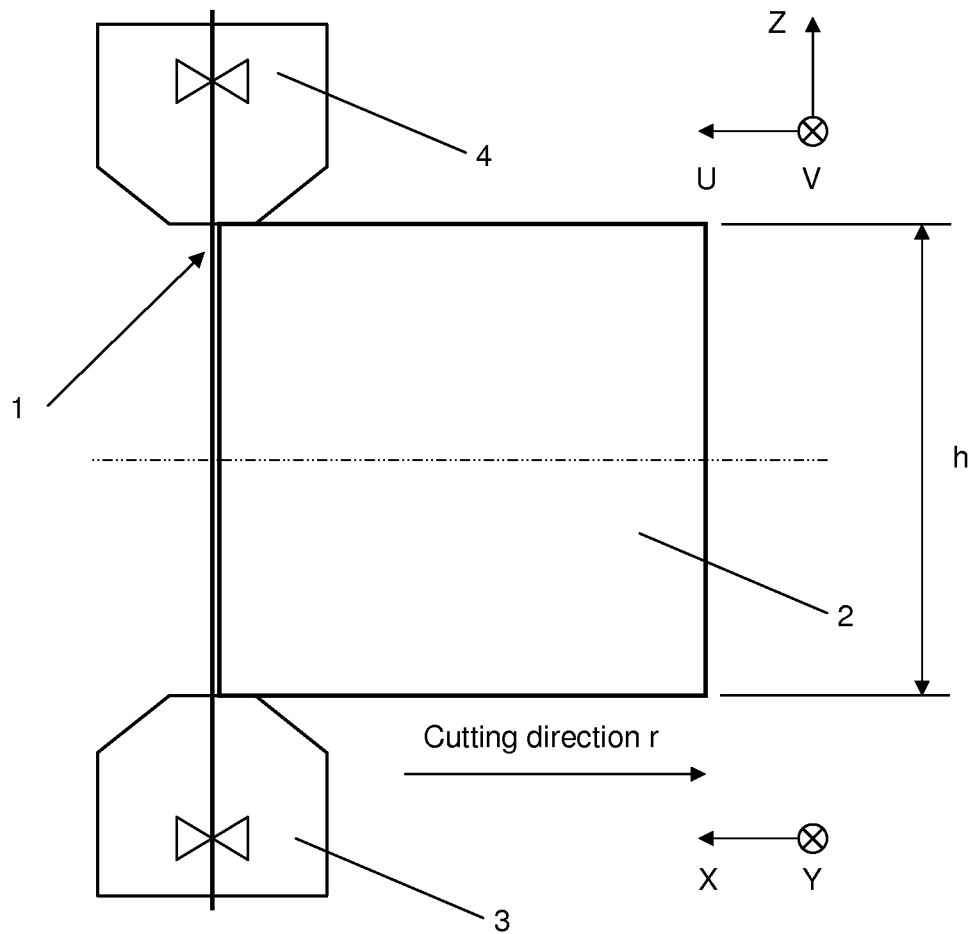
FIG. 2 shows the conventional designation of the axes in wire electric discharge machines.

The graph in FIG. 1 shows the cutting rate as a function of the workpiece height in a wire electric discharge machine according to the current prior art in a qualitative illustration, such as may be gathered, for example, from the company publication "Experience" mentioned in the introduction.

The cutting rate reaches maximum at a height of about 60 mm, is already around 20% below maximum at 150 mm and then falls very sharply. It is scarcely possible for workpieces with very high electrical resistance to be machined if they have a greater height. The invention therefore affords a solution for increasing the cutting rate for high workpieces, but also a method for the cutting of materials with high electrical resistance.

Figure 3A:
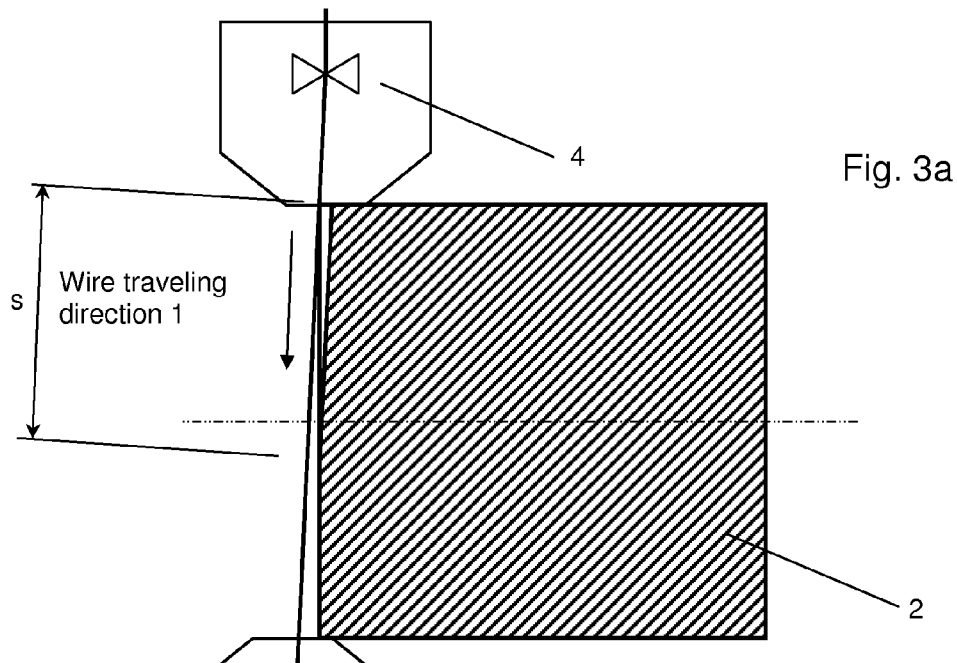
FIGS. 3a, 3b show an illustration of the setting of the angular position of the wire in a cutting method according to the invention in the case of a cutting machine with a reversing wire traveling direction.
Figure 3B:
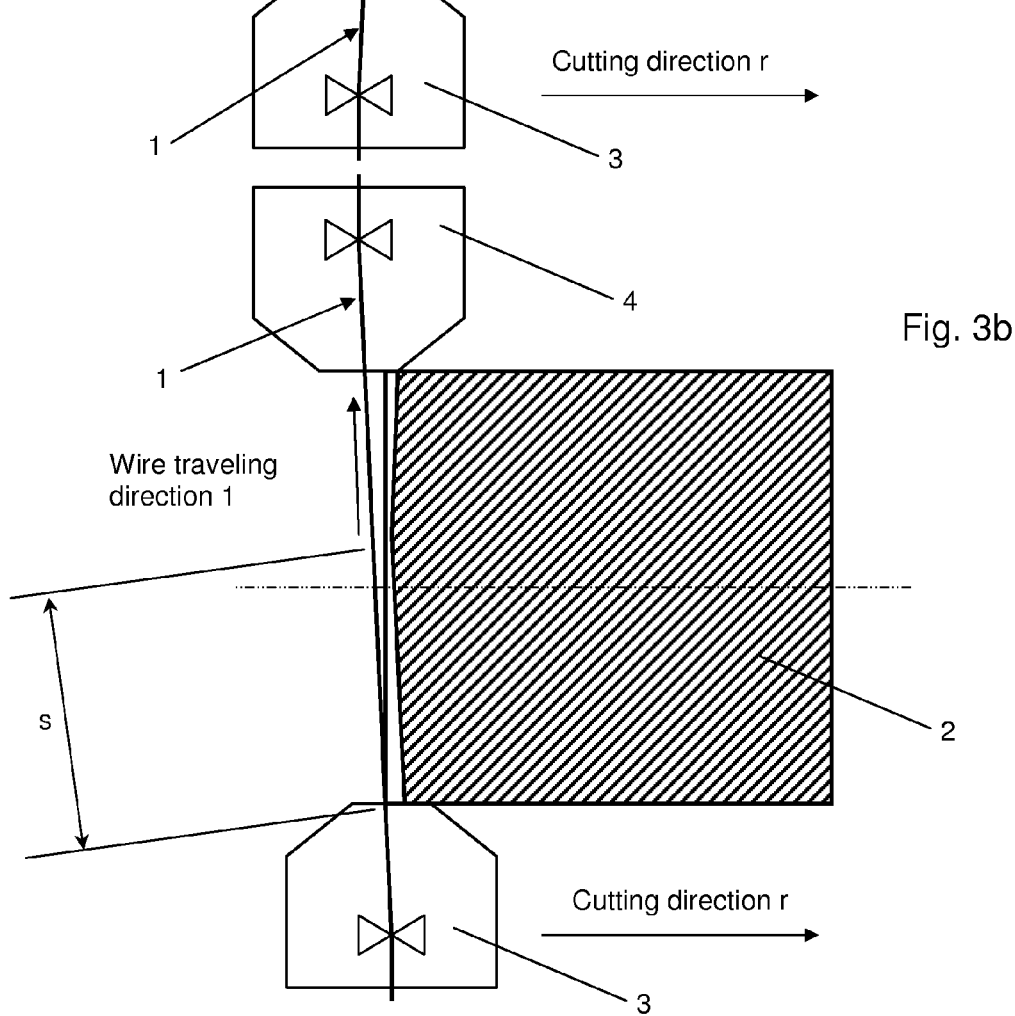

The traveling wire 1 is, as stated, inclined alternately in at least two different specific angular positions in the cutting direction r, see FIGS. 3a and 3b. This takes place preferably as a result of the relative displacement of the upper wire guide 4 with respect to the lower wire guide 3. A wire electric discharge machine regularly has, for example, X/Y-axes, U/V-axes and a Z-axis, which enable the upper wire guide 4 to be adjusted with respect to the lower wire guide 3. For example, for a first time duration, the upper wire guide 4 is offset forwards in the cutting direction with respect to the lower wire guide 3, with the result that the wire 1 is set in a first specific angular position; for a second time duration, the upper wire guide 4 is set back with respect to the lower wire guide 3, with the result that the wire 1 is set in a second specific angular position. Each specific angular position is set for a specific time duration, so that the workpiece 2 can be machined in the respective angular position. This procedure is repeated as desired, the two different angular positions in each case being set alternately. If appropriate, the X-axis and/or Y-axis are/is also involved in setting the relative position of the tool with respect to the workpiece 2.

To carry out the method, the relative angular position between the wire and workpiece must be variable. In a further embodiment, the setting of the at least two different angular positions takes place on the workpiece, the workpiece being pivoted about an axis perpendicularly to the plane defined by the wire traveling direction and cutting direction. The workpiece is, for example, tension-mounted on a commercially available axis of rotation and is brought alternately into at least two different specific angular positions with respect to the at least one wire.

The embodiment described here, with an axis of rotation, is suitable preferably for pivoting the workpiece in a single direction of rotation. This may prove advantageous in terms of the machining equipment used, especially when a plurality of wires are simultaneously in engagement, when a plurality of wire portions of the same wire are led up to the workpiece in parallel and the workpiece is machined simultaneously at a plurality of locations, and/or when machining comprises a single cutting direction. Particularly in dedicated machining equipments, the device for pivoting the workpiece is preferably coordinated with the special machining tasks. To that extent, the device for pivoting the workpiece may also be designed specially, for example as a two-sidedly supported pivoting gondola for small pivot angles.

A further embodiment or possibility for setting different angular positions on the workpiece is a pivotable worktable, for example a worktable with parallel kinematics according to "Design of hybrid-kinematic mechanism for machine tool" by Patric Pham, Thesis EPFL 4314, page 130 (http://dx.doi.org/10.5075/epfl-thesis-4314).

Preferably, relatively small angular positions are set, for example of +/−2°, so that cutting conditions are otherwise similar to those in the case of what is known as a cylindrical cut, that is to say with the wire traveling through vertically. Only slight axial displacement (X/Y/U/V) therefore has to be carried out for the purpose of setting the different angular positions.

The process for changing over the angular position is preferably interrupted briefly, for example by generator switch-off, or at least the process parameters are briefly reduced. However, this interruption or reduction is limited to a few 100 ms.

In addition to the wire electric discharge machines (WEDM) mentioned in the introduction, what are known as Fastwire machines are known (Fastwire machines are also designated as FW machines or HS-WEDM; see also http://blueline.gfac.com/index.php?id=14942&L=0). In contrast to the abovementioned WEDM machines, the wire traveling direction in FW machines is reversing, that is to say the wire electrode runs alternately in one direction and then in the opposite direction. The same wire electrode is used repeatedly. The wire electrode, typically a molybdenum wire, travels at high speed and, by entrainment, ensures the exchange of the flushing liquid in the cutting gap. Material removal takes place in an electrochemical/electrothermal mixed process. FW machines are in widespread use particularly in Asia, since the procurement and maintenance costs are very low. In traditional industrial countries, FW machines have hitherto had almost no sales, mainly because the degree of automation is very low and because they cannot compete in performance terms with those of the substantially more costly WEDM machines.

The following description relates essentially to WEDM and FW, although this is not to be understood as being restrictive.

The invention can be used especially advantageously in conjunction with FW machines. Since a process intermission for reversing the wire traveling direction is periodically necessary in any case in FW machines, the relative angular position of the wire with respect to the workpiece in the cutting direction is preferably changed simultaneously. The FW machine typically has a wire stock of about 600 m. The wire traveling speed amounts to about 10 m/s, so that the wire traveling direction is reversed after about 60 s. With a workpiece height of 100 mm and a typical cutting rate of 100 $mm^2$/min, the cutting speed therefore amounts to about 1 mm/min. Thus, about 1 mm of the 100 mm high workpiece is therefore cut at a time in each wire traveling direction.

The FW wire traveling direction and the angular position of the wire in the cutting direction are preferably coordinated with one another such that the wire, when it enters the cutting gap, strikes immediately onto the workpiece subheight to be machined. If therefore, for example as illustrated in FIG. 3a, just the upper wire guide 4 is offset forwards in the cutting direction with respect to the lower wire guide 3, the wire traveling direction l will be set in such a way that the wire 1 runs to the workpiece 2 from above. If, by contrast, as illustrated in FIG. 3b, just the lower wire guide 3 is offset forwards in the cutting direction with respect to the upper wire guide 4, the wire traveling direction l will be set in such a way that the wire 1 runs to the workpiece 2 from below. The clean flushing liquid thus arrives earlier at the active location in the cutting gap. This measure may also be employed in other wire cutting methods with a reversing wire traveling direction, for example an abrasive cutting method with loose abrasive grain (slurry).

The precondition for adopting the method according to the invention with an FW is also, here, that the wire can be inclined alternately in at least two different angular positions. The above-described pivoting devices may likewise be used for setting the at least two different angular positions of the wire and/or of the workpiece. In cutting machines without U/V-axes, a device for adjusting a wire guide by a fixed amount is sufficient in the simplest form. The at least two different specific angular positions can consequently simply be set, to be precise, on the one hand, the vertical wire traveling direction (first angular position) and, on the other hand, a second angular position arising as a result of offsetting a wire guide.

The invention is employed preferably in straight contour portions because it is known that inclining the wire in the cutting direction in curved contour portions (radii and corners) leads to a contour error. The contour error depends on the instantaneous contour curvature, on the angle of inclination of the wire and on the workpiece height. The same relations and boundary conditions apply as are explained extensively in the prior art (EP2223400) mentioned in the introduction. If a specific contour error is accepted, the method according to the invention can therefore also be used in the region of slightly curved contours.

To change over the specific angular positions, a process intermission is preferably introduced. No material removal takes place during this process intermission. The changeover between the specific angular positions should therefore occur quickly. The periodic changeover from one angular position to the other preferably takes place at the maximum positioning speed; however, the wire should reach the respective target position without overshooting. Consequently, after an intermission for changing over the relative angular position of the wire with respect to the workpiece, the wire is preferably not moved directly to the target position to resume machining, but instead to an approach position which lies, for example, 5 to 500 µm, typically 50 µm, before the target position. The end position, that is to say the position of the workpiece and/or of the wire, is stored, before an intermission for reversing the relative angular position of the wire with respect to the workpiece, with a view to subsequent machining in the same relative angular position. The target position for resuming machining corresponds to the end position of the wire at the end of the preceding cutting period in the same angular position. The new target position of the workpiece and/or of the wire for resuming machining after an intermission for changing over the relative angular position of the wire with respect to the workpiece is determined by the stored end position of the workpiece and/or of the wire during a preceding machining phase in the same relative angular position. The wire preferably moves from the approach position to the target position at reduced speed; in the case of wire-erosive machining, preferably at the maximum process-controlled speed.

According to the invention, the wire is preferably inclined in two different angular positions in the cutting direction; however, the method according to the invention may also be implemented with three or more different specific angular positions. The average effective cutting height of the number of different angular positions can thereby be divided correspondingly.

The wire or workpiece is preferably inclined alternately into two different specific angular positions in the cutting direction, the amount of the angle of inclination of the two angular positions with respect to the workpiece or to the vertical wire traveling direction being identical, and the directions of inclination being opposed. For example, the wire or workpiece is inclined once forwards in the cutting direction and once backwards in the cutting direction, for example by the same amount.

Figure 4A:
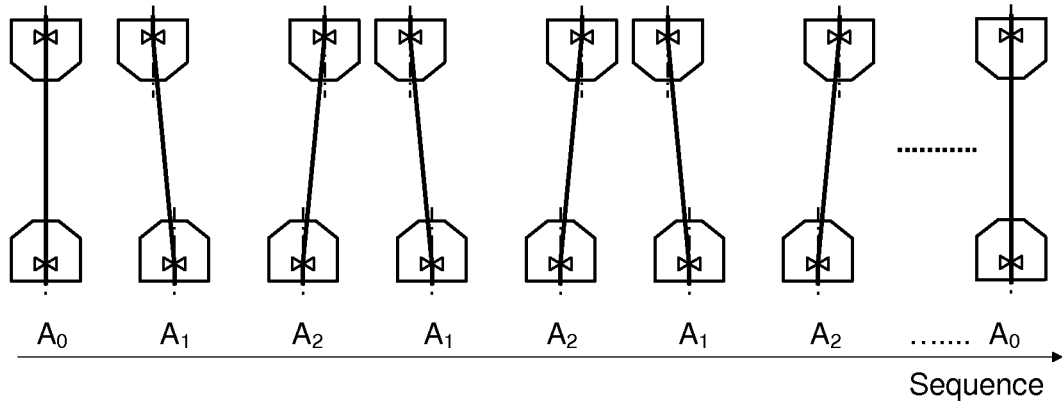
FIGS. 4a-c show the illustration of possible sequences for setting the angular position of the wire in a cutting method according to the invention.
Figure 4B:
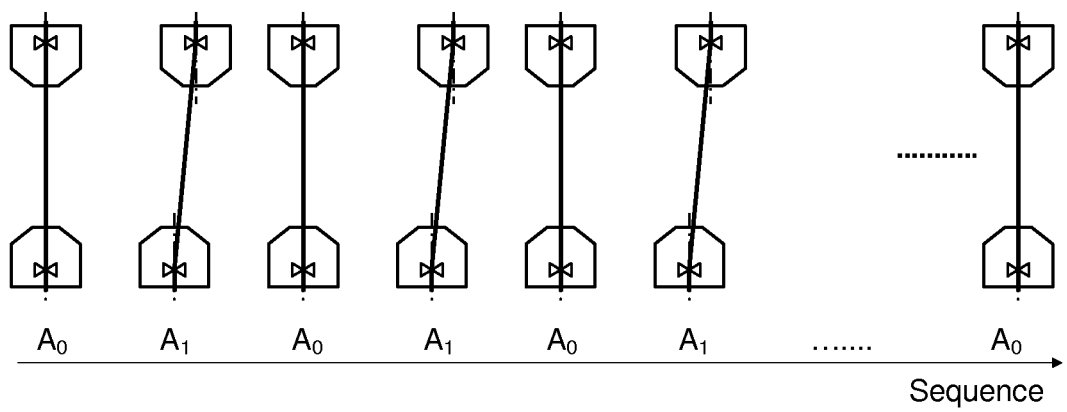
Figure 4C:
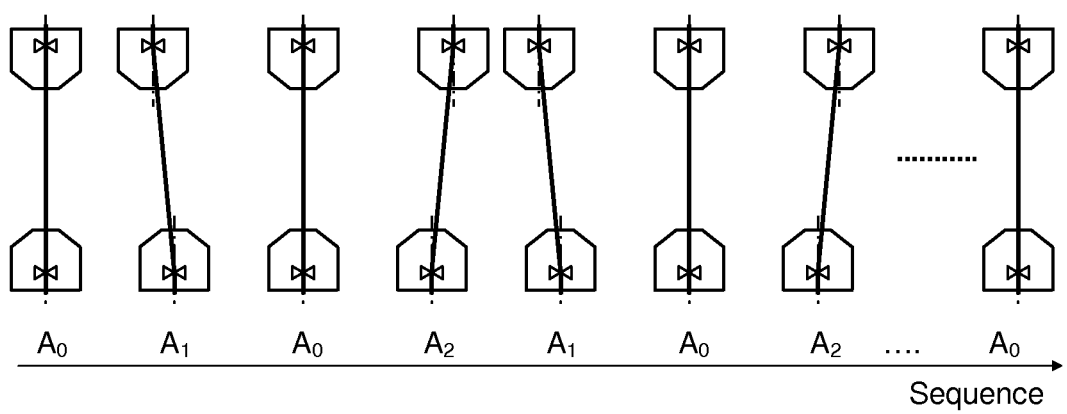

FIGS. 4a to 4c show a non-conclusive selection of possible wire inclination sequences. The cutting method preferably starts and/or ends in the vertical wire traveling direction, the at least two different specific angular positions being set alternately between the start and end. When the wire is straightened at the start and end of a straight contour portion, corners and radii can be generated without any contour errors.

FIG. 4a shows a wire inclination sequence in which the wire is first in the vertical initial position $A_0$; a first angular position $A_1$ in the cutting direction and a second angular position $A_2$ in the cutting direction are then set alternately; the angular positions $A_1$ and $A_2$ are set alternately until the end of machining or of the contour portion. Finally, the vertical wire traveling direction $A_0$ is set again.

The cutting method preferably starts from one of the at least two specific angular positions, that is to say the initial position corresponds to one of the at least two specific angular positions.

FIG. 4b shows a wire inclination sequence with two specific angular positions, in which the wire is first in the vertical position; here, the vertical wire traveling direction $A_0$ is one of the two angular positions to be set; the first specific angular position $A_0$ in the cutting direction and a second specific angular position $A_1$ in the cutting direction are set alternately.

FIG. 4c shows a further wire inclination sequence in which three different specific angular positions in the cutting direction are set alternately.

Figure 5A:
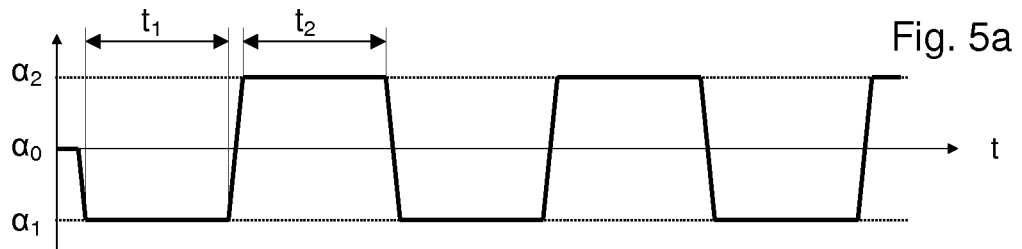
FIGS. 5a-c show the graphical illustration of the angular position as a function of time during the setting of the respective wire inclination sequence according to FIGS. 4a to 4c.
Figure 5B:
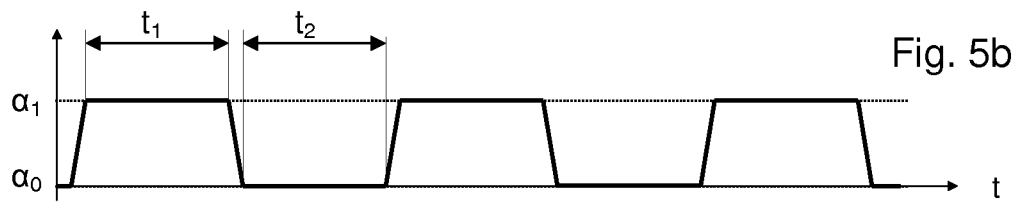
Figure 5C:
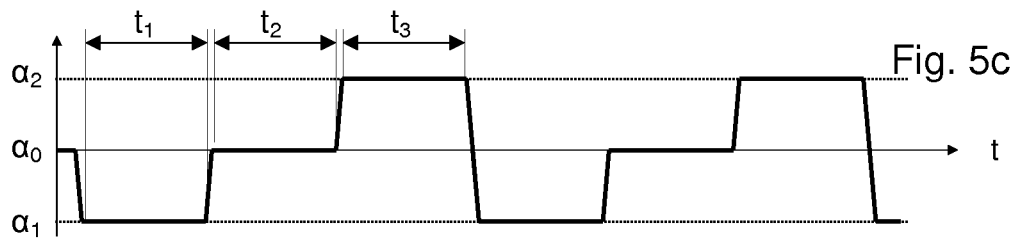

FIGS. 5a to 5c show the profile of the angular position with respect to the vertical wire traveling direction and the angles of inclination of the wire with respect to the vertical wire traveling direction $\alpha_0$ as a function of time during the setting of a wire inclination sequence according to FIGS. 4a to 4c. As already mentioned in connection with FIG. 4a, FIG. 5a relates to a wire inclination sequence in which two different specific angular positions $A_1$ and $A_2$ are set alternately during the machining of a contour portion. Each specific angular position is set for a specific assigned time duration ($t_1$, $t_2$) and the workpiece is machined in the respective specific angular position. The angular position $A_1$ is set with the angle of inclination $\alpha_1$ (negative here) for a time duration $t_1$. In the machining intermission between $t_1$ and $t_2$, the wire is brought from an angle of inclination $\alpha_1$ to an angle of inclination $\alpha_2$. The second angular position $A_2$ is maintained for a time duration $t_2$. The process is subsequently repeated by the angular position $A_1$ being set again, etc.

The time duration for which a specific angular position is set depends on several factors. In FW machines, the length of the wire stock is limited and the wire traveling speed is relatively high. In FW machines with a reversing wire traveling direction, the time duration for which a specific angular position is set corresponds preferably to the time duration between two reversals of the wire traveling direction. In machines with a very large wire stock (for example, several kilometres), the time duration for which a specific angular position is set is preferably predetermined or is determined respectively is calculated on the basis of the cutting rate.

Each time duration ($t_1$, $t_2$, $t_3$, ...) for each angular position is preferably optimized with a view to maximum cutting performance. In this case, preferably at least the process intermission for changing over the angular position and the respective cutting performance in this specific angular position are taken into account.

Each time duration ($t_1, t_2, t_3, \ldots$) is preferably of equal length, so that the machining fraction and the average effective cutting height are essentially identical in each angular position.

However, the machining fractions in the at least two different specific angular positions do not necessarily have to be identical. For example, the wire may be inclined into a first specific angular position in the cutting direction for ⅗ of the time and may be inclined into a second specific angular position in the cutting direction for ⅖ of the time. This may be advantageous, inter alia, where the cutting performance is different in the two different specific angular positions, for example when inhomogeneous cutting conditions are present over the workpiece height.

Figure 6A:
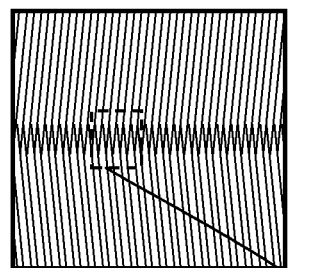
FIGS. 6a-d show the illustration of the cutting plane of a workpiece during the setting of the angular position of the wire according to FIGS. 4a-c.
Figure 6B:
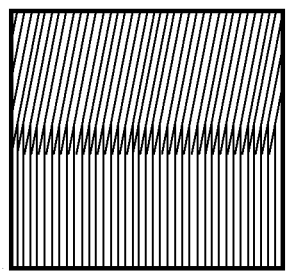
Figure 6C:
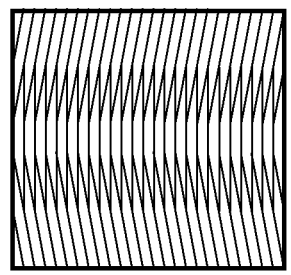

FIGS. 6a to 6c show in each case an illustration of the cutting plane of a workpiece during the setting of the angular position of the wire according to FIGS. 4a to 4c. The recognizable pattern shows the regions over which a specific angular position has been set. Two different angular positions and a transitional region can be seen in FIGS. 6a and 6b. FIG. 6c shows three different angular positions and two transitional regions. The engagement height, varying over the time duration ($t_1, t_2, t_3, \ldots$), on the workpiece, that is to say the effective cutting height on the workpiece in the respective angular position, can also be seen in FIGS. 6a to 6c.

Figure 6D:
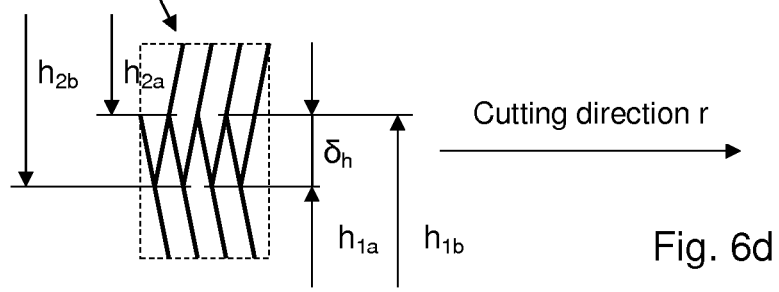

FIG. 6d shows an enlargement of a window from FIG. 6a. The effective cutting height is smallest ($h_{1a}, h_{2a}$) at the start of a subperiod and increases constantly up to the end of the subperiod ($h_{1b}, h_{2b}$). During the alternating setting of two different specific angular positions, the average effective cutting height on the workpiece is equal to half the sum of $h_{1b}$ and $h_{2b}$. The difference $\delta_h$ between the minimum and the maximum engagement height on the workpiece is given by the time duration for which a specific angular position is set, by the amount and direction of the angular positions and by the cutting rate. $\delta_h$ should preferably not be too high so that the machining conditions do not change sharply over a time duration in which a specific angular position is set. A suitable angular position can therefore be derived and set, for example, on the basis of the cutting rate to be expected and a permissible difference $\delta_h$.

Figure 7A:
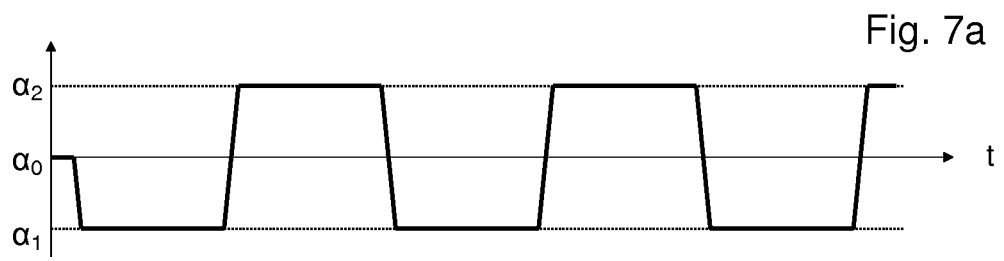
FIGS. 7a-c show respectively a graphical illustration of the angular position (7a) and the wire traveling direction (7b) and the switch-on of a pulse generator as a function of time in a machine with a reversing wire traveling direction.
Figure 7B:
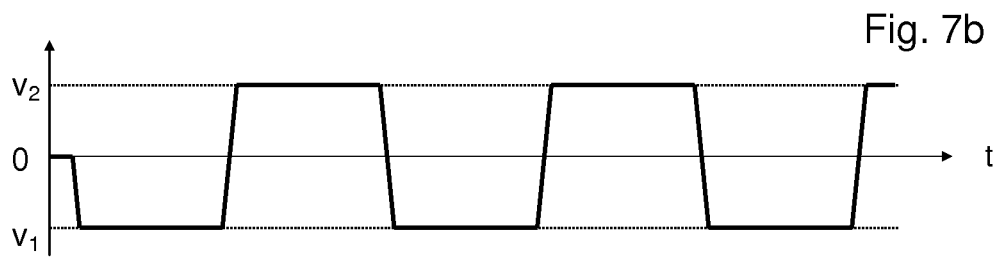
Figure 7C:
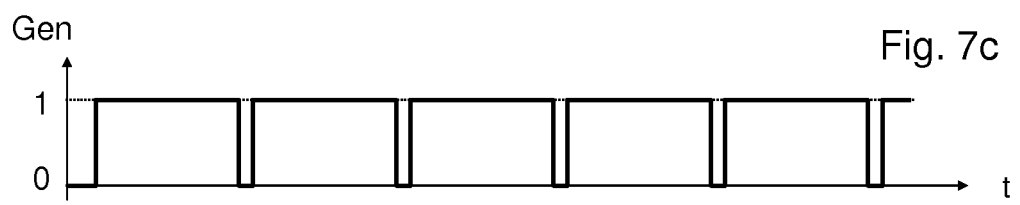
Figure 8:
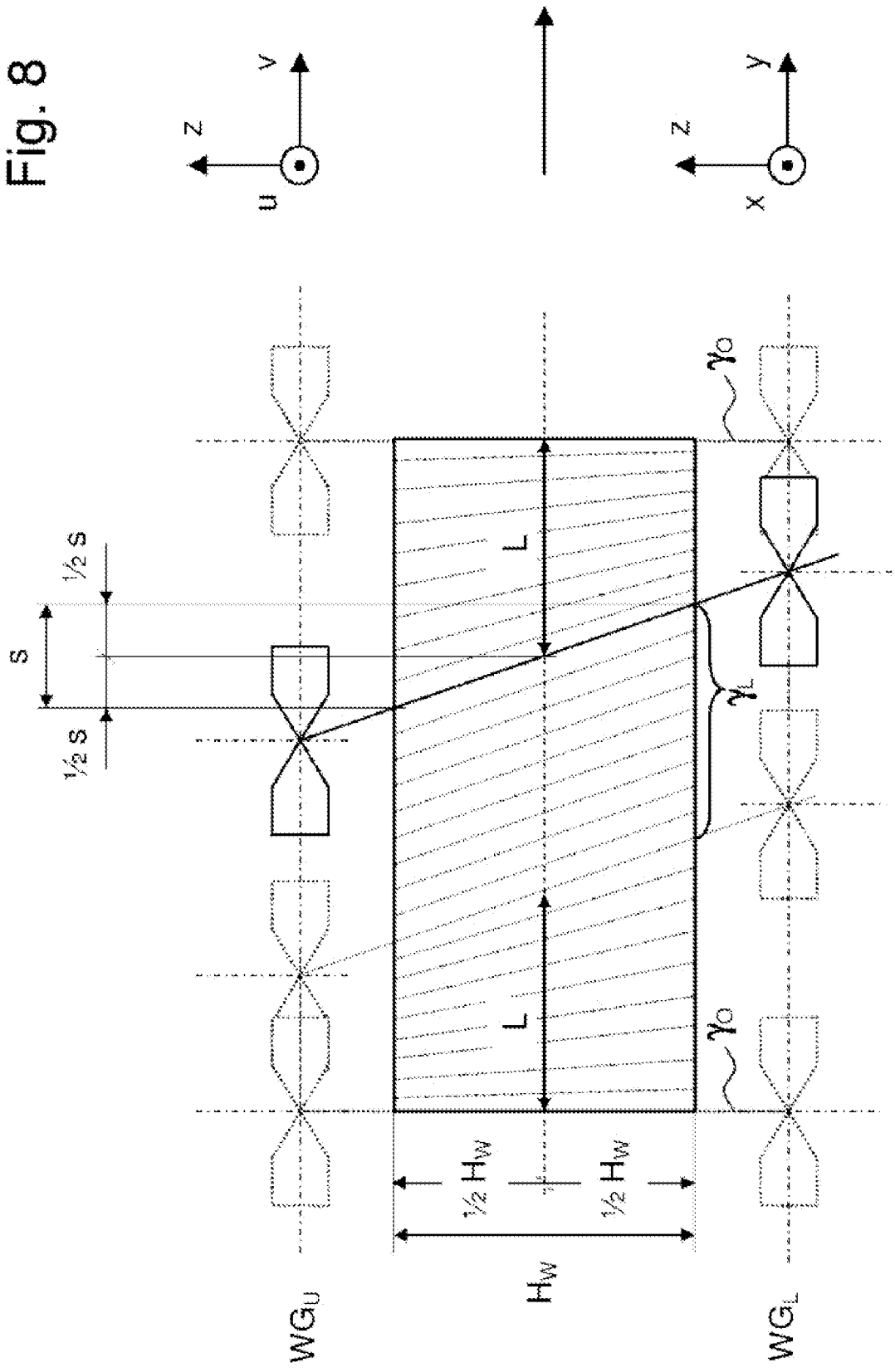
FIG. 8 shows the illustration of the cutting plane of a workpiece in a known method for improving the surface quality.

FIG. 7b shows the curve representing the wire traveling speed against time in a machine with a reversing wire traveling direction, for example an FW machine. The wire traveling speed is zero at the start; the wire traveling speed $v_1$ is then set and maintained for a first time duration; the wire traveling direction is subsequently changed over and the wire traveling speed $v_2$ is set for a second time duration. The two wire traveling directions are set alternately. FIG. 7c shows the switch-on of a pulse generator as a function of time and the switch-off during a process intermission.

FIG. 7a shows a graphical illustration of the angular position or angle of inclination as a function of time; FIG. 7a corresponds to the above-described FIG. 5a. The change in angular position is preferably carried out simultaneously with the changeover of the wire traveling direction, since machining is in any case interrupted during the changeover.

The control program can preferably ascertain automatically whether the wire cutting method according to the invention can be employed advantageously. For this purpose, the cutting rates to be expected when used for the cutting method according to the invention are compared with the cutting rates for traditional cutting methods. The cutting rates to be expected are stored, for example as a function of the material and/or workpiece height, for example in the form of tables, in a memory of the machine control. In addition to the cutting rates, other comparative criteria, for example target values, such as surface quality, contour accuracy, etc., are also stored.

The wire cutting method according to the invention is preferably combined with a multiple-wire system, for example with a multiple-wire system in which a wire is deflected and guided in a multiple manner in such a way that two or more wire portions of the same wire are led up to the workpiece in parallel and the workpiece is machined simultaneously at a plurality of locations, or, in a further example, with a multiple-wire system in which a plurality of independent wires are led up to the workpiece in parallel, and the workpiece is machined simultaneously at a plurality of locations.

The invention is preferably suitable for what is known as full cutting (also main cut). The method is especially suitable for simple severance with a specific cutting direction.

The invention can advantageously be used particularly in the case of a large workpiece height; in WEDM, a useful increase in the cutting rate is to be expected particularly from around 150 mm. In the case of special materials with poor conductivity (semiconductors, quartz, ceramic, etc.), an increase in the cutting rate is possible even when the workpiece height is lower.

The invention claimed is:

1. A method for cutting a workpiece (2) by means of a traveling wire (1), comprising the steps of alternatively inclining relative to one another a wire (1) and/or a workpiece (2) into at least two different specific angular positions in a cutting direction (r), wherein an effective cutting height (s) on the workpiece (2) becomes smaller than the entire workpiece height (h), and a cutting process intermission occurs during a change between said at least two different specific angular positions, during which cutting process intermission no material removal takes place and the specific angular positions of the wire and the workpiece are changed.

2. The method according to claim 1, wherein one of the at least two different specific angular positions in the cutting direction (r) is the vertical wire traveling direction.

3. The method according to claim 1, including alternately inclining at least one of the wire (1) and the workpiece (2) into two different specific angular positions in relation to one another in the cutting direction (r), wherein the amount of the angle of inclination of the two specific angular positions being identical and the directions of inclination being opposed.

4. The method according to claim 1, including alternately reversing the wire traveling direction (1) of the wire, wherein the relative angular position of the wire with respect to the workpiece is changed during the reversal of the wire traveling direction (1).

5. The method according to claim 1, including coordinating with one another the wire traveling direction (1) and the relative angular position of the wire in the cutting direction (r), wherein the wire, when it enters a cutting gap, strikes immediately onto a workpiece cutting region to be machined.

6. The method according to claim 1, wherein the wire (1) is redirected and guided in a multiple manner in such a way that two or more wire portions are led up to the workpiece (2) parallel to one another, and the workpiece (2) is machined simultaneously at a plurality of locations.

7. The method according to claim 1, wherein a plurality of wires are led up to the workpiece (2) parallel to one another, and the workpiece (2) is machined simultaneously at a plurality of locations.

8. The method according to claim 1, including removing material from the workpiece by one of spark-erosively, electrochemically and abrasively.

9. The method according to claim 1 wherein the at least two different specific angular positions in a cutting direction comprise three specific positions: a first incline; a second incline opposite the first incline; and a neutral position.

10. The method according to claim 1 comprising alternatingly:
   in a first of said at least two different specific angular positions, cutting from a first side of the workpiece partially through to an opposite second side of the workpiece with the wire moving between two wire guides from the first side toward the second side; and
   in a second of said at least two different specific angular positions, cutting from the second side of the workpiece partially through to the first side of the workpiece with the wire moving between the two wire guides from the second side toward the first side.

11. The method according to claim 1 wherein the at least two different specific angular positions in a cutting direction consist of exactly two or three specific positions.

12. The method according to claim 1, wherein each specific angular position in the cutting direction (r) is set for a specific assigned time duration ($t_1$, $t_2$, $t_3$), and the workpiece (2) is machined in each angular position.

13. The method according to claim 12, wherein the time duration for each specific angular position in the cutting direction (r) is optimized for maximum cutting performance.

14. The method according to claim 12, including providing a lower wire guide (3) and an upper wire guide (4), wherein at least one of the wire guides (3, 4) is displaced in relation to one another in the cutting direction for setting the at least two different specific angular positions in the cutting direction (r).

15. The method according to claim 12, including pivoting the workpiece (2) about an axis perpendicularly to a plane defined by wire traveling direction and cutting direction for setting the at least two different specific angular positions in the cutting direction (r).

16. The method according to claim 1 wherein the alternatively inclining comprises:
   cutting at a first of said at least two different specific angular positions, starting at a first effective cutting height ($h_{1a}$) and ending at a second effective cutting height ($h_{1b}$) smaller than the entire workpiece height; and
   cutting at a second of said at least two different specific angular positions, starting at a third effective cutting height ($h_{2a}$) and ending at a fourth effective cutting height ($h_{2b}$) smaller than the entire workpiece height.

17. The method according to claim 16 wherein the alternatively inclining comprises:
   cutting at a third of said at least two different specific angular positions, starting at a fifth effective cutting height and ending at a sixth effective cutting height smaller than the entire workpiece height, the cutting at the third of said at least two different specific angular positions comprising cutting a central portion of the workpiece not reaching the faces of the workpiece.

18. The method according to claim 16 wherein:
   the first of said at least two different specific angular positions is normal to the cutting direction.

19. The method according to claim 1, including prior to the process intermission for reversing the relative angular position of the wire (1) with respect to the workpiece (2), an end position of the workpiece (2) and/or of the wire (1) is stored for subsequent machining in the same relative angular position.

20. The method according to claim 19, including determining by the stored end position of the workpiece and/or of the wire (1) during a preceding machining phase in the same relative angular position a target position of the workpiece (2) and/or of the wire (1) for resuming machining after process intermission for changing over the relative angular position of the wire (1) with respect to the workpiece (2).

21. The method according to claim 20, including determining an approach position which is set back by a specific amount in the cutting direction (r) with respect to the target position for resuming machining.

22. The method according to claim 21, wherein the reversal in the relative angular position of the wire (1) with respect to the workpiece (2) takes place at maximum positioning speed up to the approach position, and the position for resuming machining is obtained at process-controlled speed.

\* \* \* \* \*